United States Patent Office 2,894,988
Patented July 14, 1959

2,894,988

AMMONOLYSIS OF META NITRO PARA CRESOL

John Cryer, New Lenox, Ill., assignor to The Sherwin-Williams Company, Cleveland, Ohio, a corporation of Ohio No Drawing. Application May 21, 1956
Serial No. 585,978

6 Claims. (Cl. 260—581)

The present invention relates to an improvement in a process for the manufacture of meta nitro para toluidine by ammonoylsis of meta nitro para cresol.

It is established that meta nitro para toluidine may be produced by ammonolysis of meta nitro para cresol and as far as the applicant is aware the only patent relating to this particular subject is that of Frye and Vagenius, U.S. 2,128,700, wherein one molar proportion of meta nitro para cresol was subjected to slightly more than one molar proportion of ammonia in aqueous form in an autoclave at about 150° to 160° C. for 5 to 7 hours in the presence of a molar proportion of an alkali metal formate. The process of Frye et al is illustrated herein, in the examples which follow, and the yield obtained thereby is relatively low.

It is the object of the present invention to increase the yields obtained in the ammonolysis of meta nitro para cresol over the prior art processes, not only through control of ammonolysis conditions but by inclusion in the ammonolysis reaction of greater than catalytic amounts of ammonium chloride, and a closer control of temperature and temperature level, which is very critical.

A further discovery related to the objects of this invention is the importance of actual process conditions. If, for example, any of the components are contaminated with traces of metal ions, or if the reaction is conducted in an unlined iron vessel yields fall off. Minor proportions of metals have been found to cause serious deterioration in yield. It has been found that number 316 stainless steel vessels are suitable for the purposes of this invention, but that uniformly high yields are obtained only after a number of runs have been made, and the walls of the stainless steel vessel have been so coated as to passivate the metal walls and inhibit passing into solution of metal ions of the vessel.

Another object of this invention is to control reaction temperature conditions during processing so that instead of formation of tars as by-products as in prior art processes, some unreacted meta nitro para cresol is recovered, which may be recycled and not lost. The principal advantage of the process herein outlined is that yields of purified meta nitro para toluidine of the order of about 90% are consistently attained.

The method of manufacture of meta nitro para toluidine, to which this invention is directed, comprises subjecting one molar proportion of meta nitro para cresol, at least about one mole of ammonium chloride (more than merely a catalytic amount) and at least 6 mols of ammonia in an aqueous environment wherein the molar ratio of ammonia to water is at least greater numerical value than 1:2 in an autoclave passivated against metal ion donation under the conditions of the processing, to the autogenous pressures which develop in the autoclave at temperatures above 125° C. but not exceeding 150° C. and preferably less than 145° C. for from about 6 to 40 hours, or a time sufficient to complete substantially the ammonolysis of said cresol.

The general technique involved in the present process, when operating on a laboratory scale, is to cool a stainless steel autoclave in a Dry Ice-acetone bath to 50 to 60° below zero, and while the autoclave is at this temperature to load it with the reactants, namely: ammonium chloride, meta nitro para cresol, aqueous ammonia and anhydrous ammonia cooled to a similar temperature range. After the vessel is loaded, the autoclave is closed, and the temperature allowed to gain up to room temperature. Thereafter, the temperature of the reactants is raised to a range of at least above 125° C. but not more than about 145° C. The contents of the autoclave are kept agitated by shaking. The time of reaction will vary in accordance with the conditions and the concentration of the reactants used. Usually the reaction time is more than 6 hours. However, the duration of time does not appear to be particularly critical and reaction conditions have been maintained for as long as 30 and 40 hours without difficulty. A few runs at varying times under otherwise standard conditions will indicate the optimum time of reaction for the particular conditions within the described ranges selected.

In the laboratory procedure, during initial stages of the investigation of the process after amination had been completed the autoclave was allowed to cool to 110° C. and the pressure vented carefully. Upon reaching standard room pressure and temperature conditions below about 110° C. the contents of the autoclave were slurried with water and made slightly alkaline with aqueous caustic soda solution. The crude product was filtered and washed. The filtrate and washings were acidified to recover unreacted cresol. The crude meta nitro para toluidine was extracted with hot toluene and treated with an especially prepared fullers earth ("Superfiltrol") and refiltered to remove impurities. Meta nitro para toluidine was recovered by recrystallization. The yield of pure product was determined from the weight of the recovered crystals.

In later laboratory work and early plant development, loss of valuable reactants was found to be unnecessary through introduction of process modification in recovery of the product other than above outlined for use in the laboratory. Instead of cooling and venting the autoclave after completion of the reaction, it was found feasible to withdraw the aminated product from the bottom of the autoclave by opening a valve near its base. The meta nitro para toluidine and the aqueous reactants had separated into two layers at the end of the amination period. The lower layer could be forced from the bottom of the vessel due to pressure in the autocalve. After withdrawal of the lower organic layer, an analytical check made upon the supernatant water layer remaining in the autoclave provides information essential to a build-up of reactants for subsequent aminations. Conditions of the aqueous layer in the autoclave are brought back to initial starting strengths by further addition of anhydrous ammonia, water, and ammonium chloride, as needed. Requisite amounts of meta nitro para cresol are pumped into the autoclave under pressure and the amination process repeated. By this means, economics of the recovery have been markedly improved. The recovery process is to be covered in a continuation-in-part application to be filed when specific data for optimum handling has been made available.

The following examples are illustrative of the process of this invention, and where confustion may arise with art most nearly pertaining thereto, examples are also given for comparative purposes. While the examples are not exhaustive, they are illustrative of the best method of practice of my process and differentiate over results obtained in known prior art processes by direct comparison therewith.

Example I

A two liter stainless steel autoclave was cooled to 50 to 60° below zero C. in a Dry Ice-acetone bath. 150 parts ammonium chloride, 250 parts distilled meta nitro para cresol, 427 parts 28% ammonia (aqueous solution) and 189 parts $NH_3$ were weighed into the autoclave and the vessel closed. After two and one-half hours processing time the temperature reached 140° C. and the pressure in the vessel measured 625 to 630 pounds per square inch. The contents were kept mixing by shaking the autoclave. Temperature conditions of 140° C. were maintained for 30 hours. The autoclave was allowed to cool and the ammonia vented slowly. After venting, the contents of the autoclave were at about 110° C. whereupon the contents were slurried with about 1000 parts water and five parts caustic. The product was then filtered and washed, the filtrate and washings worked up to recover unreacted cresols. Dried residue of crude MNPT recovered totaled 229 grams. The yield, based on MNPC consumed, was 95.6%. The crude was extracted with hot toluene, treated with fuller's earth ("Superfiltrol") and the MNPT recovered by crystallization. The amination yield of purified product was 92% (average—three runs) and the conversion yield was 83% of the meta nitro para cresol initially added. The molar ratio of $NH_3$ to $H_2O$ is about 1:1.

Example II

A run was made similar to that in Example I, but the meta nitro para cresol was contaminated with 0.001% of ferrous ion. The amination yield dropped from 92% to 77% and the conversion yield fell from 83% to 75%.

Similar runs using sodium, aluminum, nickel, copper and other metal ions likely to be contaminants, disclosed the extreme sensitivity of the reaction to the presence of the metal ions tried, and a marked drop-off in yield. While high yields could be obtained in 316 stainless steel vessels and glass, it was found essential to consistent high yield to make an initial series of runs in new metal vessels to condition the surface thereof to obtain high yields of product.

Example III

In equipment similar to that used in Example I, 1000 parts 28% $NH_4OH$, 111 parts sodium formate and 250 parts meta nitro para cresol were heated to a temperature of 150° C. whereupon a pressure of 240#/sq. in. were developed. Conditions were maintained for 6 hours. The autoclave was cooled and vented and the purified MNPT recovered. The amination yield was 35% and no unreacted metal nitro para cresol was recoverable or recovered from the residue. This process is described by Frye and Vagenius in U.S. 2,128,700.

Example IV

In equipment similar to the previous examples, 250 parts meta nitro para cresol, 108 parts ammonium chloride and 544 parts 10% aqueous ammonia solution were heated for 12 hours at 200° C. No meta nitro para toluidine was recovered.

Example V

Similar to Example IV, with the exception that the temperature was dropped to 160° C. The amination yield was 29.3. The amount of meta nitro para cresol recovered was 102 parts and the conversion yield was 17.3%. 43 parts MNPT were recovered.

Example IV is drawn from German Patent 49,060 of August 21, 1889, which relates to amination of dihydric phenols and Example V applies the temperature of Frye et al. to the German process.

These examples demonstrate lack of analogy between amination of nitro cresol and dihydric phenols.

Example VI

In equipment as used in the prior examples, 250 parts meta nitro para cresol, 90 parts ammonium chloride, 770 parts 28% aqueous ammonia and 90 parts anhydrous ammonia were reacted at 140° C. and pressure of 370#/sq. in. for twelve hours. No nitro cresol was recovered and the yield of meta nitro para toluidine fell to 56.1%.

The examples illustrate the importance of the molar ratio of ammonia to water. Here the ratio is 1:1.7.

Example VII 248.6 parts nitro cresol, 126 parts 28% ammonium hydroxide, 107 parts anhydrous ammonia were processed in equipment as in the prior examples at a temperature of 140° C. for a time of 36 hours. The amination yield was 78% and the conversion yield 66%.

Absence of ammonium chloride from the reaction accounts for lower yield.

Example VIII

In this example 2 mols of meta nitro para cresol were amianted in a ten fold excess of ammonia in aqueous solution where the molar ratio of ammonia to water was 1.15:1 in the presence of 1 mol of ammonium chloride at a temperature of 140° C. for 36 hours.

The amination yield was 81.4%, the conversion yield 76.2% and there was 9.8% carbonaceous residue. Note that the yield is of inferior nature when the ratio of ammonium chloride to nitro cresol is not at least in excess of 0.5:1.

Example IX

In equipment similar to that used in Example I; one mol meta nitro para cresol, four mols ammonium chloride, 7.2 mols $NH_3$ and 17.1 mols water were heated to 140° C. for 66 hours under good agitation (corresponds to 29.6% aqueous ammonia or a mol ratio of ammonia to water of 1:2.37).

The amination yield was 75.4%, the conversion yield was 72.4% and there was recovered 14.8% carbonaceous residue. Here, the molar excess of $NH_3$ is low (6.2 moles), the ratio of ammonia to water is low (1:2.4) although compensation was attempted in the quantity of ammonium chloride used.

The above examples illustrate that in obtaining a high yield of meta nitro para toluidine by amination of meta nitro para cresol the conditions under which the reaction is carried out may be varied only slightly. However, it is possible to operate under conditions outside a preferred range at a correlative sacrifice in overall yield of the desired product. In its broadest aspects minimum concentrations of reactants are such that there is at least ½ mol of ammonium chloride per mol of cresol; at least 7 mols of $NH_3$ per mol of cresol and at least ½ mol of $NH_3$ per mol of water. Minimum temperature and maximum temperature are both critical. In the broadest aspect a temperature below 125° C. is not effective, 130° C. is useful but not preferred, 140° C. is preferred, 145° C. is useful and at 150° C. tars start to develop in objectionable amount. The time of reaction appears to vary from 5 to about fifty hours, but is less critical above about 6 hours than any other factor in the process.

Having described and illustrated the best mode of practicing my improved process for aminating meta nitro para cresol, what I claim as my invention is:

1. A method of manufacture of meta nitro para toluidine which comprises subjecting one molar proportion of meta nitro para cresol, at least in excess of one half mol of ammonium chloride, in excess of six mols of ammonia in a metal ion free aqueous environment wherein the molar ratio of ammonia to water is at least greater in numerical value than 1:2 in an autoclave to the autogenous pressure developed therein at a temperature above 125° C. but less than 150° C. for a time sufficient to complete substantially the ammonolysis of said cresol.

2. A method of manufacture of meta nitro para toluidine which comprises subjecting one molar proportion of metal nitro para cresol, at least one mol of ammonium chloride, at least six mols of ammonia in a metal ion free aqueous environment wherein the molar ratio of ammonia to water is greater in numerical value than 1:2 in an autoclave to the autogenous pressure developed therein at a temperature of at least 125° C. but not in excess of 145° C. for a time sufficient to complete substantially the ammonolysis of said cresol.

3. A method of manufacture of meta nitro para toluidine which comprises subjecting one molar proportion of meta nitro para cresol, at least one mol of ammonium chloride and about eight mols of ammonia in a metal ion free aqueous environment wherein the molar ratio of ammonia to water is greater than 1:2 in an autoclave to the autogenous pressure developed therein at a temperature of from 130° to not more than 145° C. for a time sufficient to complete substantially the ammonolysis of said cresol.

4. A method for the manufacture of meta nitro para toluidine which comprises subjecting one molar proportion of meta nitro para cresol, about two mols of ammonium chloride and about ten mols of ammonia in a metal ion free aqueous environment wherein the molar ratio of ammonia to water is greater than 1:2 in an autoclave to the autogenous pressure developed therein at a temperature of from 135 to 145° C. for a time sufficient to complete substantially the ammonolysis of said cresol.

5. A method for the manufacture of meta nitro para toluidine comprising heating together in an autoclave at autogenous pressure at a temperature above 125° but less than 150° C. one mol of meta nitro para cresol, at least one mol of ammonium chloride and in excess of six mols of ammonia in the metal ion free aqueous environment wherein the molar ratio of ammonia to water is greater in numerical value than 1:2 for from five to fifty hours.

6. A method for the manufacture of meta nitro para toluidine which comprises heating together one mol of meta nitro para cresol, in excess of one mol of ammonium chloride and in excess of eight mols of ammonia in a metal ion free aqueous environment wherein the molar ratio of ammonia to water is between 1:2 and 6:1 in an autoclave to the autogenous pressure developed therein at a temperature in excess of 125° but not in excess of 145° for a time sufficient to complete substantially the ammonolysis of said cresol.

References Cited in the file of this patent

UNITED STATES PATENTS

| 2,128,700 | Frye et al. | Aug. 30, 1938 |

FOREIGN PATENTS

| 597,947 | Canada | Nov. 24, 1953 |
| 49,060 | Germany | Sept. 13, 1889 |